June 25, 1957 S. S. GREEN ET AL 2,797,401

ELECTRONIC TIMING PULSE GENERATOR

Filed May 20, 1954 2 Sheets-Sheet 1

INVENTORS,
CAMERON B. FORREST,
SIDNEY S. GREEN,
BY
Henry Heyman
ATTORNEY.

TIME →

INVENTORS.
CAMERON B. FORREST,
SIDNEY S. GREEN,
BY
Henry Heyman
ATTORNEY.

United States Patent Office 2,797,401

Patented June 25, 1957

2,797,401

ELECTRONIC TIMING PULSE GENERATOR

Sidney S. Green, Minneapolis, Minn., and Cameron B. Forrest, Los Angeles, Calif., assignors to Hughes Aircraft Company, Culver City, Calif., a corporation of Delaware Application May 20, 1954, Serial No. 431,122

11 Claims. (Cl. 340—174)

The present invention relates to an electronic timing pulse generator, and more particularly to a timing pulse generator which is responsive to the magnetization of a magnetic medium for producing a train of electrical timing or clock pulse signals, and which is responsive to the train of electrical timing signals to suppress crosstalk produced by associated magnetic recording elements which are actuated by the timing signals.

In many electronic systems, and especially in high-speed electronic computing machines, electrical signals corresponding to coded intelligence information are recorded on a magnetic storage medium, such as a magnetic tape or the periphery of a magnetic drum, by passing the storage medium past an associated recording or writing transducer and magnetizing the medium in a predetermined polarization pattern corresponding to the electrical signals. The recorded information may thereafter be read by passing the magnetic storage medium past a reading transducer which detects changes in the magnetization of the medium and generates electrical signals corresopnding to the recorded intelligence information.

Owing to the fact that the speed of the recording medium as it passes the reading and recording transducers is not constant, it is essential to employ a referencing system for synchronizing recording and reading operations with the physical movement of the magnetic recording medium. In this manner, information to be recorded may be magnetically written in predetermined cells or unit lengths on the magnetic medium, while recorded information to be read may be physically located and detected on the recording medium. In practice, it is customary to reference the magnetic recording medium by providing thereon a plurality of adjacent magnetizable tracks, on one of which there is recorded a timing track which is read by an associated reading transducer to provide periodically recurring timing or clock pulses indicative of the movement of the magnetic medium, one pulse being generated for each cell passing by the reading transducer. Intelligence information is then recorded on or read from the corresponding cells on the adjacent magnetizable tracks by actuating associated recording and reading transducers with the clock pulses derived from the timing track.

One of the principal limitations of a magnetically recorded timing track has been the fact that crosstalk is induced in the reading transducer employed in cooperation with the timing track, this crosstalk being produced by fringe flux emanating from adjacent recording transducers when they are actuated by the generated clock pulses. The crosstalk, in turn, produces extraneous and undesirable voltage excursions in the signal presented at the output of the timing track reading transducer, these voltage excursions being capable of causing the generation of a false clock pulse signal or causing associated amplifier circuits to block and thereby obliterate subsequent clock pulses.

In the prior art, objectional crosstalk has been eliminated to some extent by shielding the recording or writing transducers. However, this technique is limited by the fact that shielding usually is not completely effective and, in addition, increases the bulk of the recording and reading transducers, thereby limiting the number of transducers which may be packed adjacent each other in a given volume. Still other prior-art attempts to eliminate crosstalk have included spacing the magnetic transducers from each other by relatively large distances and staggering the windings on adjacent transducers to reduce fringe flux. These attempts, however, have resulted in decreased efficiency in the utilization of the magnetizable area of the recording medium and have materially increased the cost of fabrication of suitable transducers.

The timing pulse generator of the present invention, on the other hand, suppresses induced crosstalk by making use of the fact that crosstalk is induced in the timing track reading transducers only within a predetermined time interval after the generation of a clock pulse, since the clock pulse is in actuality the electrical signal which initiates the crosstalk by actuating adjacent magnetic recording transducers. According to the basic concept of the present invention, the electrical signal generated by the timing-track reading transducer is passed through a normally open gate circuit and is shaped to present the desired periodically occurring timing or clock pulse signals. Each clock pulse is then employed to close the gate circuit for a predetermined time interval to suppress both the electrical timing signal and the superimposed crosstalk signal which are induced in the timing track transducer. At the end of the time interval, which is shorter than the interval between successive clock pulses, the gate circuit is again rendered operative to pass the output signal from the timing-track reading transducer, thereby enabling the generation of the next clock-pulse signal.

In its basic structural form, the timing pulse generator of the present invention comprises a movable magnetic medium having a timing pulse track recorded thereon, a reading or transducer circuit including a reading magnetic head or transducer positioned adjacent the timing track of the recording medium for generating electrical output signals corresponding to the magnetization of the timing track and an amplifier for amplifying the signals, a pulse forming circuit responsive to applied input signals for generating electrical clock or timing pulse signals, a normally open gate circuit coupled to the reading circuit and the pulse forming circuit for normally applying the electrical output signals generated by the reading circuit to the pulse forming circuit, and a control circuit, including a multivibrator, coupled to the gate circuit and the pulse forming circuit, and responsive to the electrical clock pulse signals for closing the gate circuit for a predetermined time interval commencing immediately after receiving each clock pulse signal. Although obviously not so limited, the pulse forming circuit utilized to illustrate the present invention may include a wave shaping amplifier and a blocking oscillator.

According to one embodiment of the invention, the timing pulse generator of the invention, the control circuit includes a delay network and a bistable multivibrator or flip-flop. The output signal from the timing-track reading circuit is sequentially amplified and passed through the normally open gate circuit which is operable under the control of the associated flip-flop or bistable multivibrator to inhibit the passage of the signal appearing at the output of the amplifier. The electrical signal appearing at the output of the gate circuit is then applied to the waveshaping amplifier, the output signal of which is utilized to trigger the blocking oscillator to produce the clock-pulse signal. The clock-pulse signal is in turn employed to trigger the control flip-flop to close the normally open gate circuit and thereby suppress crosstalk simultaneously generated by associated circuits which are actuated by the clock pulse. Each clock pulse is also applied to the delay network to produce a delayed clock-pulse signal at the end of a predetermined time interval, shorter than a clock-pulse interval, the delayed clock-pulse signal being utilized to reset the control flip-flop to its normal state and thereby open the gate circuit.

According to another embodiment of the timing pulse generator of the invention, the control circuit includes a single-shot, slide-back or monostable multivibrator. The output signal from the timing-track reading circuit is passed through the normally open gate circuit which is operable under the control of the associated single-shot or slide-back multivibrator. In this embodiment of the invention, each generated clock pulse is employed to trigger the multivibrator to its astable state to suppress the undesirable crosstalk. By making the astable conduction interval of the multivibrator shorter than the clock-pulse interval, the normal single-shot multivibrator reverse switching action again renders the associated gate circuit operative in time to permit the generation of the succeeding clock-pulse signal.

In each of the embodiments of the invention, the output signal from the timing-track reading transducer is effectively suppressed or inhibited immediately following the generation of each clock-pulse signal, thereby suppressing crosstalk appearing in the output signal from the transducer. Consequently, the generation of erroneous crosstalk signals, or the blocking of associated amplifier circuits by crosstalk, is prevented.

It is, therefore, an object of this invention to provide timing pulse generators utilizing the generated clock-pulse signals to suppress crosstalk induced in an associated timing-track reading transducer.

It is another object of the invention to provide timing pulse generators which are responsive to the polarized magnetization of a magnetic recorded timing track to generate a periodically occurring clock-pulse signal and which utilizes the clock-pulse signal to gate off the timing-track signal for a predetermined interval following the generation of each clock-pulse signal.

An additional object of the invention is to provide a timing pulse generator in which an electrical signal corresponding to the magnetization of a magnetically recorded timing track is passed through a normally open gate circuit and is employed to generate a periodically occurring clock-pulse signal, each clock pulse being utilized to close the gate circuit for a predetermined time interval after the generation of the clock pulse.

Still another object of the invention is to provide a timing pulse generator in which an electrical signal corresponding to the magnetization of a magnetically recorded timing track is passed through a normally open gate circuit, operable under the control of a multivibrator, to generate a periodically recurring clock-pulse signal, each generated clock-pulse signal being utilized to trigger the multivibrator to close the gate circuit for a predetermined time interval after the generation of the clock pulse.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
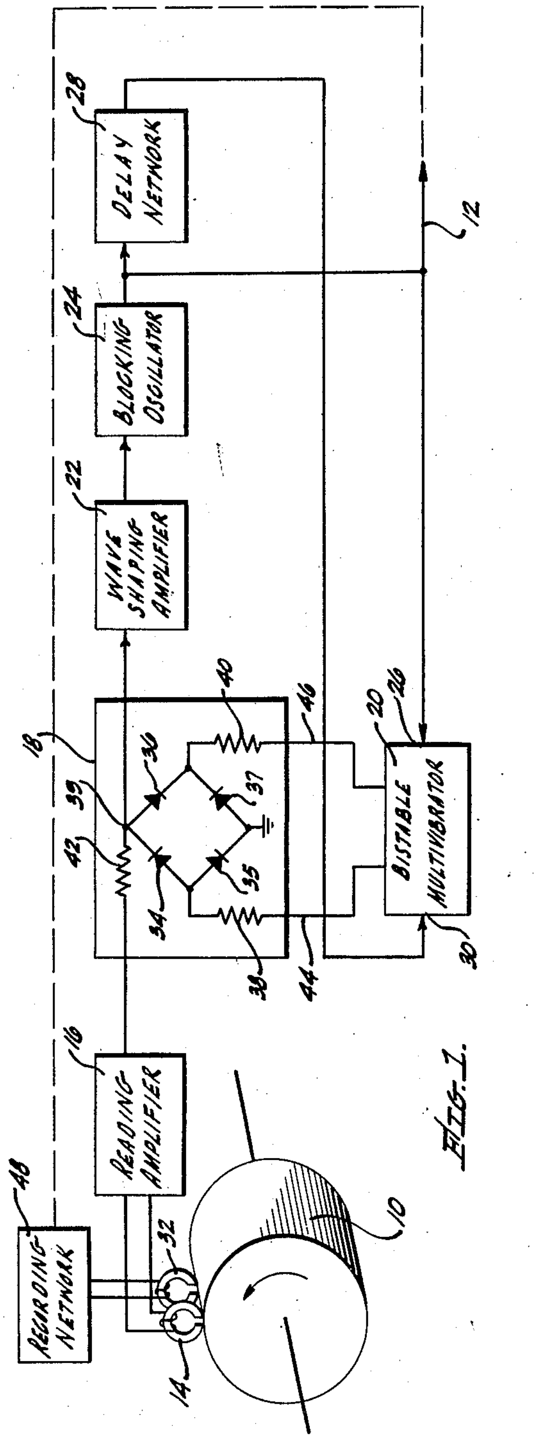
Fig. 1 is a schematic diagram of one embodiment of a timing pulse generator, according to the invention.

Referring now to the drawings, wherein like reference characters are utilized to designate like or corresponding parts throughout the several views, there is shown in Fig. 1 a timing pulse generator, according to the invention, which is responsive to the alternately polarized magnetization of a timing-track recording medium, such as the periphery of a magnetic drum 10, for generating a train of timing or clock pulses on a clock-pulse bus 12. The polarized magnetization of drum 10 is converted to a corresponding electrical output signal by means of a reading circuit including a reading transducer 14 which is positioned adjacent the periphery of magnetic drum 10 and which is responsive to rotation of the magnetic drum by a motor, not shown.

The output signal from transducer 14 is applied to the input circuit of an amplifier included in the reading circuit 16 which amplifies and inverts the received signal. The output signal from amplifier 16, in turn, is passed through a normally open gate circuit 18, which is operable under the control of a bistable multivibrator or flip-flop 20, to the input circuit of a pulse forming circuit composed of a waveshaping amplifier 22 and a blocking oscillator 24. The output signal from amplifier 16 is impressed on waveshaping amplifier 22 which amplifies, inverts, and clips the applied signal to present a periodically recurring triggering signal at its output circuit. The triggering signal from amplifier 22 is then applied to the input circuit of blocking oscillator 24 which functions to generate at its output circuit a relatively sharp negative pulse signal each time a triggering signal is applied to its input circuit. The output circuit of blocking oscillator 24, in turn, is connected to clock-pulse bus 12 and the input of a control circuit comprised of bistable multivibrator 20 and delay network 28. The input of the control circuit connects the output of blocking oscillator 24 to a first control terminal 26 of flip-flop 20, and to the input circuit of a delay network 28, the output circuit of the delay network being connected to a second control terminal 30 of flip-flop 20.

The function of gate circuit 18 and its associated control flip-flop 20 is to suppress or inhibit the output signal from reading amplifier 16 for a predetermined time interval after the appearance of each clock pulse on clock-pulse bus 12, thereby preventing crosstalk induced in reading transducer 14 from adjacent recording transducers, such as transducer 32, from being applied to waveshaping amplifier 22. Gate circuit 18 may be any suitable electronic gating device responsive to the voltage level of one or more applied control signals for selectively inhibiting or passing to its output circuit an applied electrical input signal. As shown in Fig. 1, for example, gate circuit 18 includes a bridge network comprising four unidirectional current devices or diodes 34, 35, 36, and 37, respectively, the anodes of diodes 34 and 35 being connected to one end of a resistor 38, while the cathodes of diodes 36 and 37 are connected to one end of a resistor 40. The cathode of diode 35 and the anode of diode 37 are, in turn, connected to a reference potential such as ground, whereas the cathode of diode 34 and the anode of diode 36 are connected to a common junction 39 which is coupled to the output circuit of amplifier 16 through an impedance 42 and to the input circuit of waveshaping amplifier 22.

Flip-flop 20 may be any conventional bistable multivibrator, such as the well-known Eccles-Jordan circuit, which has two stable states of operation and which is operable upon the application of a signal to an associated control terminal to switch from one stable state to the other and thereby vary the voltage level appearing on a pair of output conductors 44 and 46 which are respectively connected to the other ends of resistors 38 and 40. More specifically, it will be assumed that flip-flop 20 has a normal state in which a relatively high-level voltage is presented on output conductor 46 and a relatively low-level voltage is presented on output conductor 44, the application of a negative signal to control terminal 26 operating to reverse the conduction state of the flip-flop so that it is in its "non-normal" state characterized by a relatively high-level voltage on output conductor 44 and a relatively low-level voltage on output conductor 46. This condition then persists until the flip-flop is returned to its normal state by the application of a negative pulse signal to control terminal 30. For purposes of illustrating the present invention, it is assumed that the ground potential is mid-way between the relatively low-level voltage and the relatively high-level voltage developed by the outputs 44 and 46, respectively, of bistable multivibrator 20 in its normal state.

It will be recognized that gate circuit 18 is operable under the control of flip-flop 20 and presents a high impedance from common junction 39 to ground when flip-flop 20 is in its normal state, owing to the fact that diodes 34 through 37 are back-biased by the output signal from the flip-flop. More specifically, the cathodes of diodes 36 and 37 are maintained at a potential above ground due to the relatively high voltage produced on lead 46 by the bistable multivibrator 20 and the anodes of diodes 34 and 35 are maintained at a potential below ground as a result of the relatively low voltage on lead 44. When flip-flop 20 is set to its other state by the application of a negative signal to control terminal 26, the diodes in gate circuit 18 are forward-biased and common junction 39 is effectively clamped to ground through an impedance substantially equal to the relatively low forward impedance of one diode. Accordingly, if it is assumed that impedance 42 is much larger than the forward impedance of a single diode, it is clear that any signal impressed on gate circuit 18 will be shunted to ground when the diodes in the bridge circuit are forward-biased and thereby will be inhibited from appearing at the input circuit of waveshaping amplifier 22.

Consider now the operation of the timing pulse generator of the invention, which will be described with reference to Fig. 2 which illustrates a composite diagram of the electrical signals appearing at various points in the circuit of Fig. 1. In order to describe most clearly the operation of the timing pulse generator of the invention, it first will be assumed that prior to time $t_1$ in Fig. 2, flip-flop 20 is held in its normal state and that gate circuit 18 remains open to pass the signal applied from amplifier 16. In addition, it will be assumed that no crosstalk is induced in reading transducer 14 prior to time $t_1$.

Figure 2:
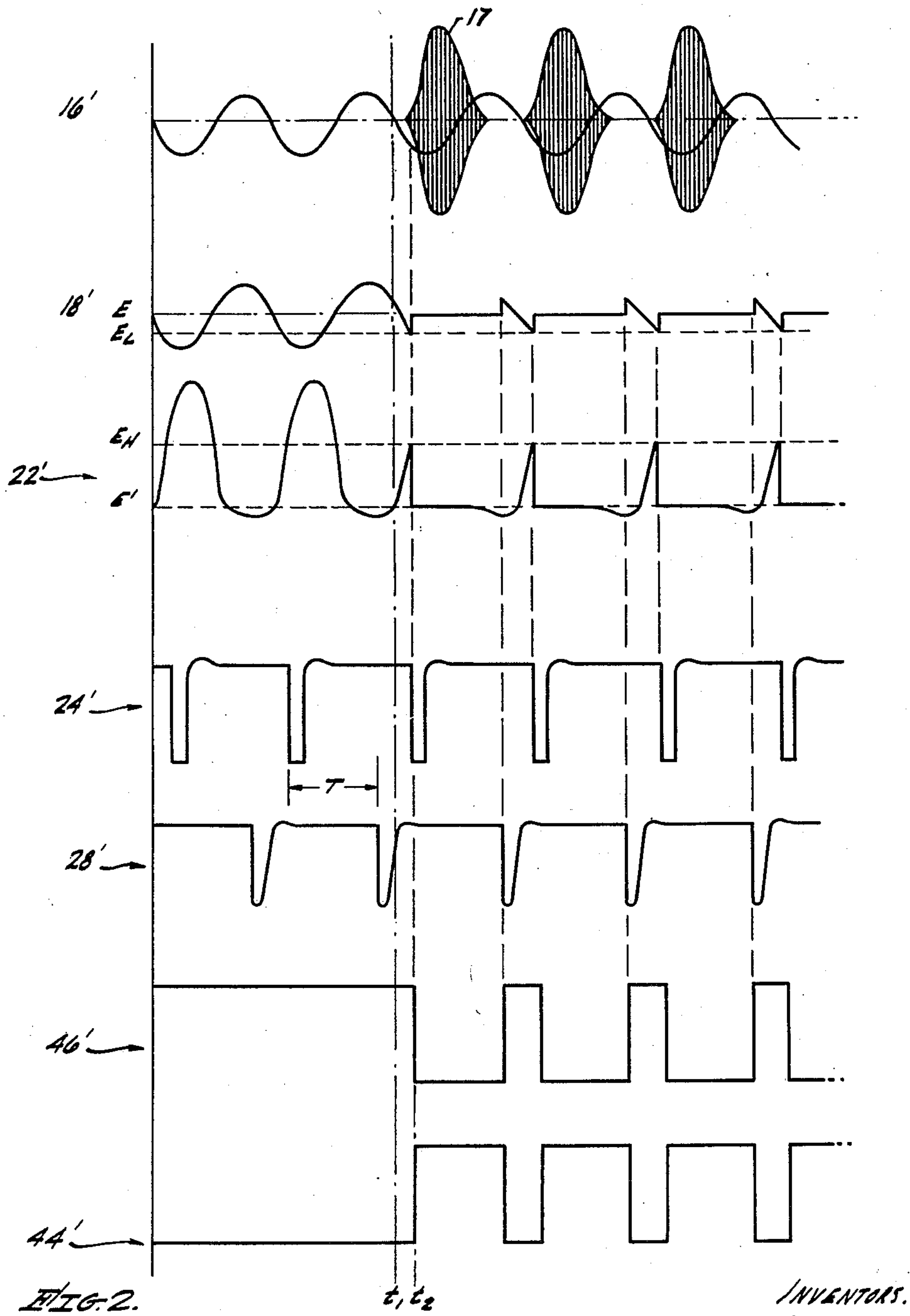
Fig. 2 is a composite diagram of waveforms appearing at various points in the circuit of Fig. 1.

Referring now to Fig. 2, both the electrical signal induced in reading transducer 14 by rotation of drum 10, and the output signal from amplifier 16 are illustrated by the waveform, generally designated 16'. Signal 16' is substantially sinusoidal in form and is induced in the reading transducer by the passage therebeneath of the alternately polarized magnetic cells of the timing track on the magnetic drum. It is clear, of course, that if amplifier 16 includes but a single amplifier stage, the signal applied at its input circuit and the signal presented at its output circuit are inverted with respect to each other, or, in other words, are 180° out of phase.

Assuming that gate circuit 18 remains open, and thus passes the signals applied at its input circuit, the signal, generally designated 18', which appears at its output circuit is substantially identical in shape with signal 16' and varies about a reference voltage level E. It is clear, of course, that voltage level E is ground potential for the specific gate circuit shown in Fig. 1, since the common junction of diodes 35 and 37 are grounded. Signal 18', in turn, is applied to waveshaping amplifier 22 which functions to invert and amplify those excursions of signal 18' which are negative with respect to voltage level E, thereby producing the output signal represented in Fig. 2 by the waveform, generally designated 22'. It will be recognized by those skilled in the art that waveshaping amplifier 22 may merely comprise an unbalanced amplifier having its control grid biased substantially at cathode potential, the voltage level E' in Fig. 2 being utilized to designate the quiescent output voltage level of the amplifier.

Signal 22' is applied to blocking oscillator 24 which functions to trigger and thereby produce a relatively sharp negative clock pulse 24' each time input signal 22' rises to a predetermined voltage level, which is designated in Fig. 2 by the voltage level $E_H$. It will be noted from Fig. 2 that the triggering of the blocking oscillator may also be referenced with the amplitude of signal 18', the blocking oscillator being triggered to produce a clock pulse when signal 18' has reached a predetermined negative voltage level $E_L$.

Clock or timing pulse signal 24' periodically recurs each time a triggering signal is presented at the output of waveshaping amplifier 22, and is applied to clock-pulse bus 12 for distribution to associated electronic circuits. In addition, the clock-pulse signal is applied to delay network 28 which functions to produce a delayed clock-pulse signal 28' at the end of a predetermined time interval after the occurrence of each clock pulse, this interval being illustrated in Fig. 2 by the time interval T. The delayed clock-pulse signal may, of course, be utilized to actuate still other associated electrical circuits, not shown.

It has been assumed in the preceding description that flip-flop 20 was held in its normal state and that, consequently, the crosstalk-suppressing feature of the invention was not functioning. Assume now that at time $t_1$ flip-flop 20 is rendered operable under the control of the pulses presented on clock-pulse bus 12 and the output circuit of delay network 28. In order to facilitate the description of the crosstalk-suppressing feature of the invention, it will also be assumed that each clock-pulse signal which is presented on clock-pulse bus 12 is utilized to actuate recording transducer 32 through an associated recording circuit 48 to record intelligence information on a magnetic track adjacent the timing track on the periphery of drum 10.

Referring again to Fig. 2, when signal 22' reaches voltage level $E_H$ at the time $t_2$, blocking oscillator 24 again functions to generate a clock-pulse output signal, this pulse being employed to energize recording transducer 32 which, in turn, creates fringe flux and induces a crosstalk signal component in reading transducer 14, the crosstalk being designated in signal 16' by the modulation envelope 17. Simultaneously, the clock pulse is applied to control terminal 26 of flip-flop 20 and functions to reverse the conduction state of the flip-flop, thereby reversing the voltage levels appearing on its output conductors 44 and 46, as illustrated by the signal waveforms, generally designated 44' and 46', respectively.

The switching action of flip-flop 20, in turn, forward-biases the diodes in gate circuit 18 and effectively inhibits crosstalk present in gate-circuit input signal from appearing in output signal 18'. More specifically, signal 18' is clamped substantially at its reference level E when gate circuit 18 is closed, this reference level being substantially ground potential for the particular gate circuit shown in Fig. 1, wherein the common junction of diodes 35 and 37 is grounded. It will be noted that signal 22' from waveshaping amplifier 22 also falls to reference level E' when gate circuit 18 inhibits the passage of its applied input signal. Consequently, crosstalk induced in reading transducer 14 is prevented from falsely actuating blocking oscillator 24 to produce an erroneous clock-pulse signal or from causing waveshaping amplifier 22 to block and suppress subsequent clock-pulse signals.

The crosstalk signal induced in reading transducer 14 has a peak amplitude shortly following the actuation of recording transducer 32 by the clock pulse signal, and thereafter decreases exponentially, as shown by crosstalk modulation envelope 17 in Fig. 2. In practice, it has been found that the time duration of this crosstalk signal is usually of the order of several micro-seconds or less. Accordingly, the time delay provided by delay network 28 is selected to produce a delayed clock-pulse output signal at a point in time after the crosstalk signal has terminated, but before blocking oscillator 24 would normally produce a succeeding clock-pulse signal. In other words, interval T between clock-pulse signal 24' and delayed clock-pulse signal 28' should be greater than the duration of the objectionable crosstalk signal, but should be less than the clock-pulse interval.

Consider now the operation of the timing pulse generator shown in Fig. 1 when the delayed clock-pulse signal 28' is presented at the output circuit of delay network 28 and is applied to control terminal 30 of flip-flop 20. The flip-flop is responsive to the delayed clock-pulse signal to reset to its normal state and thereby reopen gate circuit 18 by removing the low-impedance shunt path between common junction 39 and ground. Accordingly, signal 16' is again passed by the gate circuit, as shown by signal 18' in Fig. 2, to waveshaping amplifier 22 and produces triggering of blocking oscillator 24 in the manner previously described. The output signal from amplifier 16 is thus sampled for a predetermined time interval of each cycle of the timing-track signal to produce a periodically recurring clock-pulse signal, and is suppressed during that interval of each cycle during which crosstalk may be induced in the recording transducer.

It will be apparent to one skilled in the art that the necessary amplification of the voltage signals induced in reading transducer 14 by rotation of drum 10 to a level sufficiently high to trigger blocking oscillator 24 may be apportioned between the reading amplifier 16 and the waveshaping amplifier 22 of Fig. 1. However, as a practical matter, it is advantageous to amplify the signals to be gated to a certain optimum value by reading amplifier 16 before they are gated by gate circuit 18.

Because of the non-linear impedance characteristic of typical uni-directional devices, such as a diode in box 18, voltage signals above a certain minimum amplitude are most efficiently gated. This minimum amplitude, herein referred to as the lower potential, is determined from the characteristic curve of the diode and is based on the minimum voltage required to reach a steep portion of the characteristic curve, i. e., the minimum voltage drop across a diode in the forward direction which will result in a sufficiently heavy current flow through the diode to effectively shunt the signals to be gated. For example, when multivibrator 20 is in its non-normal state characterized by a relatively high-level (positive) potential on lead 44 and a relatively low-level (negative) potential on lead 46, any signal appearing at terminal 39 should be shunted to ground through diode 36 and resistor 40. To accomplish this, the initial potential impressed across diodes 34 and 36 resulting from the difference in potential of leads 44, 46 and of terminal 39 should be sufficiently large to insure operation on a steep portion of the diode characteristic curve.

When multivibrator 20 is in the normal state, signals appearing at terminal 39 of gate 18 having an amplitude sufficiently large to overcome the back biases impressed on diodes 34 and 36 by multivibrator 20 are effectively clipped, resulting in a distorted version of the signals being impressed on waveshaping amplifier 22. For example, if the signals appearing at terminal 39 are sufficiently negative to overcome the back bias on diode 34, current will flow through diode 34 and resistor 38 shunting that portion of the signal more negative than the negative bias developed on lead 44 by multivibrator 20. Similarly, positive signals with an amplitude greater than the back bias on diode 36 will cause current flow in diode 36 and resistor 40 thus clipping the signals. There is a maximum amplitude, therefore, above which signals to be passed by gate 18 to waveshaping amplifier 22 will be distorted by clipping. This maximum amplitude, herein referred to as the upper potential, is determined by the output voltage characteristics of the bistable multivibrator 20 as above discussed.

Efficient gating by gate 18 requires, therefore, that the signals to be inhibited (the cross-talk signals) be amplified to a value above the lower potential, and that the signals to be passed ( the clock pulse signals induced in reading transducer 14 by rotation of drum 10) be amplified to a value below the upper potential, where the lower and upper potentials are determined by the characteristics of the gate 18 and the multivibrator 20 as above discussed.

If conventional capacitor-coupled amplifier stages are employed in reading amplifier 16, it is advantageous to amplify the signals before gating by gate 18 no more than is necessary for efficient gating in order to avoid saturating or overloading reading amplifier 16 by possible large amplitude cross-talk signals. In conventional capacitor-coupled amplifier stages, saturation or overloading occurs when an input signal of sufficient strength is received to drive the control grid of one of the capacitor-coupled amplifier stages positive with respect to its cathode, thus causing grid current to flow through the grid-cathode circuit. This grid current rapidly charges the coupling capacitor, the resulting charge on the coupling capacitor maintaining the control grid at a potential at or near the potential of the cathode until the charge leaks off through the usually comparatively large grid-leak resistor. As a result, the amplifier is disabled for a period of time after the large signal is received, determined by the RC time constant of the coupling capacitor and grid leak resistor.

If the signal gain of reading amplifier 16 is limited to a value just sufficient to impress cross-talk signals on gate 18 having an amplitude slightly above the lower potential, any chance of saturation or overloading of amplifier 16 by the cross-talk signals is effectively overcome. Where the clock pulse signals have a lower amplitude than the cross-talk signals, the amplitude of the former pulses will of necessity be below the upper potential. On the other hand, if the amplitude of the clock pulses is greater than the amplitude of the cross-talk pulses, the amplitude of the clock pulses will normally still be well below the upper potential, since the range between the lower and upper potential is large for a typical diode bridge gate such as gate 18 of Fig. 1.

In the event that the amplitude of the cross-talk signals induced in reading transducer 14 fluctuates materially thus subjecting reading amplifier 16 to input signals of extremely broad amplitude variation, the danger of overloading or saturating capacitor-coupled amplifier stages in reading amplifier 16 may be eliminated entirely by substitution therefor of direct-coupled or direct-current amplifier stages therein. Direct-coupled amplifier stages, not utilizing coupling capacitors, are not subject to saturation or overloading of the nature above discussed. Direct-coupled or direct-current amplifier circuits are fully illustrated and described, for example, in Electronics Experimental Techniques by William C. Elmore and Mathew Sands, McGraw-Hill Book Co., Inc., published in New York, 1949, pages 180 to 190.

It will be obvious to those skilled in the art that the position of the reading amplifier 16 and the gate 18 of Fig. 1 may be interchanged where the signals induced in reading transducer 14 have sufficient amplitude to be efficiently gated by gate 18 before amplification.

It should be understood, of course, that the invention is not restricted to the specific embodiment shown in Fig. 1. For example, a multigrid vacuum-tube gate circuit could be employed in lieu of the specific bridge gate shown in Fig. 1, under which circumstances a single control lead from flip-flop 20 to a control grid of the tube would suffice to gate the input signal. It will also be understood from the description set forth hereinbelow that the timing pulse generator of the invention is not restricted to operation with a flip-flop as the control element for the gate circuit.

Figure 3:
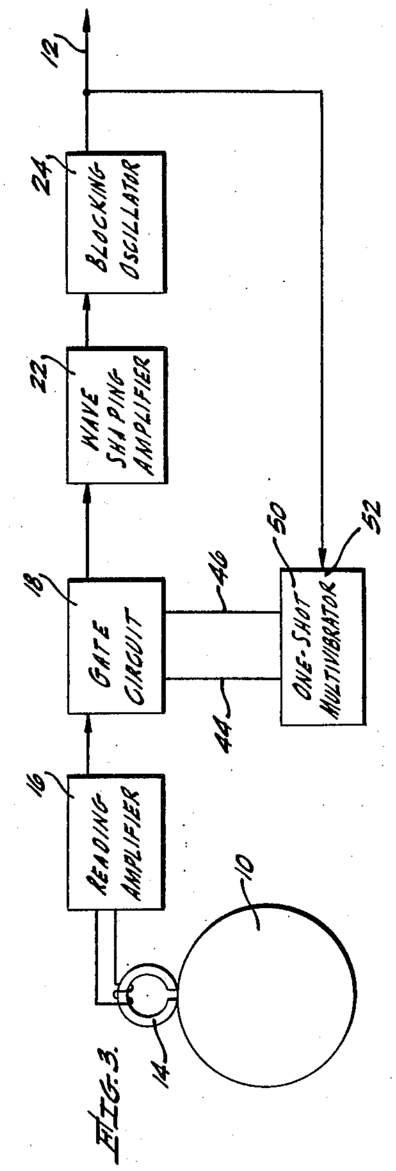
Fig. 3 is a schematic diagram of another embodiment of a timing pulse generator, according to the invention.

Referring now to Fig. 3, there is shown a modified form of timing pulse generator, according to the invention, for suppressing induced crosstalk in response to the clock-pulse signal alone without generating a delayed clock-pulse signal. The structure of this embodiment of the invention is identical in many respects with the structure of the timing pulse generator shown in Fig. 1 and includes transducer 14, amplifiers 16 and 22, gate circuit 18, and blocking oscillator 24. The only significant difference in this embodiment of the invention is that gate circuit 18 is operable under the control of a single-shot or slide-back multivibrator 50, and no delay network is employed for generating a delayed clock-pulse signal. Thus in accordance with the embodiment illustrated in Fig. 3, the control circuit includes the single-shot multivibrator circuit 20.

Multivibrator 50 may be any conventional or one-shot multivibrator which has one stable state and may be triggered to an astable state for a precisely controlled time interval by the application of a control signal at an associated control terminal 52, the multivibrator switching back to its stable state automatically at the end of this interval. Since single-shot or one-shot multivibrator circuits are well known to the art, it is not considered necessary to set forth a detailed description of multivibrator 50.

The operation of the timing pulse generator shown in Fig. 3 in generating a clock pulse is substantially identical with the operation of the circuit shown in Fig. 1. Accordingly, further description of the cyclic operation of the system in generating the individual clock pulses is considered unnecessary.

Each clock pulse generated by the blocking oscillator of Fig. 3 is applied to the single control terminal 52 of multivibrator 50 which switches to its astable state and operates, as previously described, to close gate circuit 18 and suppress its output signal. Thereafter, a suitable RC timing network in the multivibrator functions to time its astable interval, at the end of which interval the multivibrator automatically switches back to its normal operating state and reopens gate 18. It will be readily appreciated that if it is desired to duplicate the waveforms illustrated in Fig. 2 with the timing pulse generator shown in Fig. 3, the timing circuit of multivibrator 50 need only be designed to provide an interval of astable operation equal to the interval T between the generation of clock pulse 22' and delayed clock-pulse signal 28'.

It will be recognized, of course, that still other modifications and alterations may be made in the timing pulse generators herein disclosed, without departing from the spirit and scope of the invention. Accordingly, it should be expressly understood that the scope of the invention is limited only by the appended claims.

What is claimed as new is:

1. A crosstalk-suppressing timing pulse generator comprising: a movable magnetic recording medium having a timing track recorded thereon; transducer means positioned adjacent said magnetic recording medium, said transducer means including a reading transducer disposed adjacent said timing track, said transducer means being responsive to movement of the magnetic recording medium past said reading transducer for generating an electrical output signal corresponding to the magnetization of said timing track; pulse-forming means responsive to an applied electrical signal of predetermined amplitude and polarity for generating an electrical clock pulse signal; a normally open gate circuit intercoupling said transducer means and said pulse-forming means for normally applying to said pulse-forming means the output signal from said transducer means; and control means connected to said gate circuit and directly responsive to each clock pulse generated by said pulse-forming means for closing said gate circuit for a predetermined time interval commencing immediately after the generation of said clock-pulse signal, said control means including a multivibrator.

2. The timing pulse generator defined in claim 1, wherein said control means includes a delay network connected to said pulse-forming means and responsive to said clock-pulse signal for producing a delayed clock-pulse signal, and wherein said multivibrator is bistable and is connected to said gate circuit, said pulse-forming means and said delay network, said multivibrator being responsive to said clock-pulse signal generated by said pulse-forming means for closing said gate circuit, said multivibrator being responsive to said delayed clock-pulse signal for reopening said gate circuit.

3. The timing pulse generator defined in claim 1, wherein said multivibrator is of the single-shot type having an astable conduction interval corresponding to said predetermined time interval, said multivibrator being responsive to said clock-pulse signal for switching to its astable state to close said gate circuit for said predetermined time interval.

4. A timing pulse generator for generating periodically recurring electrical clock-pulse signals corresponding to the magnetization of a timing track magnetically recorded on a movable magnetic recording medium, said generator comprising: a reading circuit including a magnetic transducer positioned adjacent the timing track on the recording medium and responsive to movement of the recording medium for producing electrical output signals corresponding to the magnetization of the timing track; a normally open gate circuit coupled to said transducer for normally passing said electrical output signals; a pulse-forming circuit coupled to said gate circuit and responsive to said output signals for generating the electrical clock-pulse signals, said pulse forming circuit including waveshaping means connected to said gate circuit and responsive to said output signals for generating an electrical trigger signal when said output signals have a predetermined phase and amplitude, and a blocking oscillator connected to said waveshaping means and responsive to said trigger signal for generating the electrical clock-pulse signals; and control means connected to said gate circuit, said control means including a multivibrator and being responsive to each clock-pulse signal for closing said gate circuit for a predetermined time interval commencing immediately after the generation of each clock-pulse signal to inhibit said output signals produced by said reading circuit from being applied to said pulse forming circuit.

5. In an electronic timing pulse generator, wherein there is generated a cyclically variable electrical signal corresponding to the magnetization of a timing track recorded on a magnetic recording medium, the combination comprising: pulse-forming means responsive to an electrical input signal of predetermined amplitude and polarity for generating an electrical clock-pulse signal; normally open gating means for normally applying the cyclically variable electrical signal to said pulse-forming means; and control means responsive to each clock-pulse signal for closing said gating means immediately after the occurrence of each clock-pulse signal for a predetermined time interval to prevent the application of said cyclically variable electrical signal to said pulse-forming means during said time interval, said control means including a multivibrator, and said control means automatically opening said gating means at the end of each of said time intervals.

6. The combination defined in claim 5, wherein said gating means includes a diode bridge gating circuit and wherein said control means includes a bistable multivibrator coupled to said gating means for maintaining said gating means closed when said bistable multivibrator is in a first stable state and for maintaining said gating means open when said bistable multivibrator is in its second stable state.

7. The combination defined in claim 5, wherein said gating means includes a diode bridge gating circuit, and wherein said control means includes a single-shot multivibrator having an astable state period equal to said time interval, said single-shot multivibrator being coupled to said gating means in a manner to maintain said gating means open and closed during its stable and astable states, respectively, and said single-shot multivibrator being further coupled to said pulse forming means and responsive to said clock-pulse signal for assuming its astable state.

8. The combination defined in claim 6 wherein said control means further includes a delay network responsive to said electrical clock-pulse signal for producing a delayed signal, and wherein said bistable multivibrator is coupled to said pulse-forming means and said delay network and responsive to said clock-pulse signal for assuming said first stable state and responsive to said delayed signal for assuming said second stable state.

9. The timing pulse generator defined in claim 4 wherein said multivibrator is bistable and is coupled to said gate circuit in a manner to maintain said gate circuit closed when said multivibrator is in a first state and to maintain said gate circuit open when in its second stable state.

10. The timing pulse generator defined in claim 9 wherein said control means further includes a delay network coupled to said waveshaping means and said bistable multivibrator and responsive to said electrical clock-pulse signals, and wherein said bistable multivibrator is responsive to said clock-pulse signals for assuming said first stable state and responsive to said delayed signal for assuming said second stable state.

11. The timing pulse generator defined in claim 4 wherein said multivibrator is of the single-shot type and is coupled to said gate circuit in a manner to maintain said gate circuit open when in its stable state and closed when in its astable state, said single-shot multivibrator having an astable state period equal to said predetermined time interval and being responsive to said clock-pulse signals for assuming said astable state.

References Cited in the file of this patent

UNITED STATES PATENTS

| | | |
|---|---|---|
| 2,614,169 | Cohen | Oct. 14, 1952 |
| 2,685,682 | Sepahban | Aug. 3, 1954 |